April 25, 1967 G. R. ASCHAUER 3,315,773
ELECTRIC COIL CLUTCH IN SERIES WITH FRICTION COUPLING
Filed March 2, 1965 2 Sheets-Sheet 1

INVENTOR.
GEORGE R. ASCHAUER
BY
James E. Nilles
ATTORNEY

INVENTOR.
GEORGE R. ASCHAUER
BY
James E. Nilles
ATTORNEY

3,315,773
Patented Apr. 25, 1967

3,315,773
ELECTRIC COIL CLUTCH IN SERIES WITH FRICTION COUPLING
George R. Aschauer, Racine, Wis., assignor to Twin Disc Clutch Company, Racine, Wis., a corporation of Wisconsin
Filed Mar. 2, 1965, Ser. No. 436,490
15 Claims. (Cl. 192—48)

The present invention relates generally to clutch mechanisms of the combined wrap spring and friction clutch type.

Generally, the present invention provides a compact clutch mechanism combining an electro-magnetic coil actuated torque transmitting spring and a friction plate clutch, which mechanism is not only instantaneous in its action but also exceptionally smooth in its engagement. The mechanism provides fast torque rise with no peak or torque shock loads, has no clutch drag, and the friction clutch acts as a safety device or torque limiter.

The present invention provides a torque transmitting mechanism in which the drive member and the output member are connected together through an intermediate clutch plate hub. This hub in turn is releasably connected to one of the members by a helical spring actuated by an electro-magnetic coil, and is then constantly connected to the other member by a friction clutch which is continuously and resiliently biased to the engaged position. The arrangement is such that the helical spring need not have exceptional resiliency, need not be particularly thin or resilient to insure its wrap, and needs no particular cushioning or energy absorbing means, all because the friction clutch means can slip and absorb the impact energy of engagement. As a result, a torque transmitting spring of stiffer and consequently stronger and of more economical design may be used and the full torque passed through both the spring and through the friction clutch.

Another aspect of the invention relates to a mechanism of the above type which is particularly compact in both radial and axial dimensions and highly efficient in performing the functions for which it was designed. The arrangement of the parts is such that the spring and the friction clutch are radially nested or stacked in compact relationship.

These and other objects and advantages of the present invention will appear as this disclosure progresses, reference being had to the accompanying drawings, in which.

Figure 1:
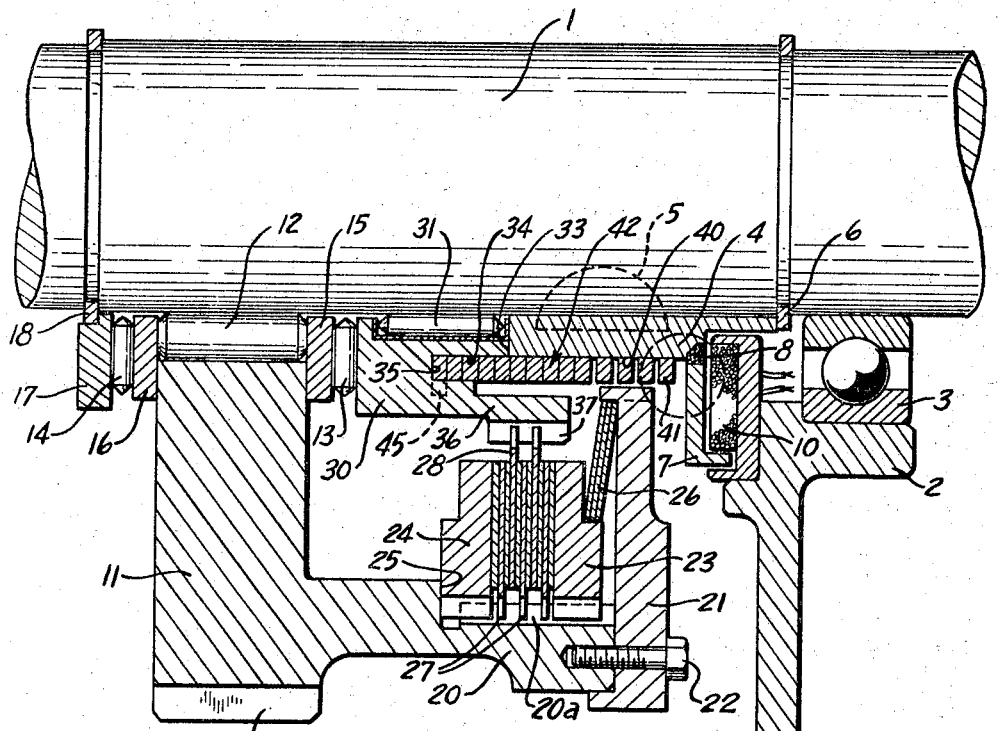
FIGURE 1 is a fragmentary, longitudinal, sectional view of a clutch made in accordance with the present invention, certain parts being shown as broken away or removed for clarity.

*FIGURE 1 modification*

Referring in greater detail to FIGURE 1 of the drawings, a rotatable drive member in the form of a shaft 1 is rotatably supported in a stationary housing 2 by means of antifriction bearing assembly 3. The drive member includes a sleeve 4 which forms a radially enlarged portion which is fixed to shaft 1 by a key 5 and snap ring 6. A radially extending flange 7 is brazed to sleeve 4, and the bronze weld 8 causes the flux path, shown by dotted lines, from the electro-magnetic coil 10 to flow as shown. The coil 10 is stationary and is fixedly to the frame or housing 2. Suitable air gaps are provided between the coil and the drive member.

A driven output member 11 is rotatably and concentrically or coaxially mounted around the drive member by means of the antifriction roller bearing assembly 12. Suitable axial thrust bearing assemblies 13 and 14, spacers 15 and 16, and back-up ring 17 and snap ring 18 hold the output member captive on the shaft, as will more fully appear. The output member includes external gear teeth 19 which mesh with other gears (not shown) of a change speed system, or other driven members. Member 11 also has an axially extending portion 20 which has the conventional internal clutch plate splines 20a and an end wall 21 fixed thereto by bolt means 22. Thus, the output member is of a drum shape which surrounds and encloses the friction clutch and spring clutch to be more fully described. Conventional clutch back-up plates 23 and 24 are also splined to the internal splines of member 11. Plates 24 bears against shoulder 25 of the member 11. Spring means in the form of Belleville springs 26 act between the end wall 21 and plates 23 to thereby constantly and resiliently bias the interleaved friction plates 27 of the member 11 and plates 28 of an intermediate clutch plate hub 30 together into a clutch engaged position. The Belleville springs, rather than coil springs, also contribute to axial compactness.

The intermediate hub 30 is shown in this embodiment as being freely and rotatably mounted on the drive member by antifriction roller bearing assembly 31 and is located between bearing assembly 13 and shoulder 33 formed by portion 4 of the drive member.

The hub has a cylindrical surface 34 formed by an axial recess 35 which opens toward the portion 4. The hub also has an overhanging portion 36 which also extends in an axial direction toward portion 4 of the drive member. The clutch plates 28 are splined in the conventional manner to the splines 37 on the periphery of hub portion 36.

Cylindrical surface 34 of the hub and cylindrical surface 40 of portion 4 of the drive member are in axial and radial alignment and form clutch surfaces around which a torque transmitting, helical spring 42 is wrapped. Some of the coils of the spring are disposed around surface 34 and others around surface 40. The end 41 of the spring which is located over surface 40 is free, and when the spring is in the uncontracted or normal position, a running clearance is provided between the surface 40 and the internal surface of the spring, and neither does the axial endmost surface 41a of the spring engage the radial flange in the non-driving position.

The other end 44 of the spring 42 is adapted for gripping engagement with the surface 34 of the hub by any conventional means. For example, the last few turns of the spring may be wrapped tightly around surface 34 so as to cause a frictional grip thereon, or the end of the spring may be turned radially outwardly to fit into a corresponding hole in the hub, as at 45.

The operation is such that when the coil 10 is energized, the end 41 of the wrap spring 42, if it is axially spaced from the flange 7, is pulled or shifted axially into contact with flange 7. In any event, the end surface 41a is frictionally engaged with the flange of the sleeve, and which instantaneously causes the spring to wind up or contract in diameter, thus tightly engaging surface 40, causing engagement of this spring clutch.

Thus, the hub is releasably connectable to the drive member by the wrap spring through which the full torque load can be transmitted.

It will be noted that the friction plate clutch and the wrap spring clutch are nested over one another, that is, they are stacked in radial alignment. The output member surrounds and encloses the friction clutch and the

FIGURE 2

Figure 2:
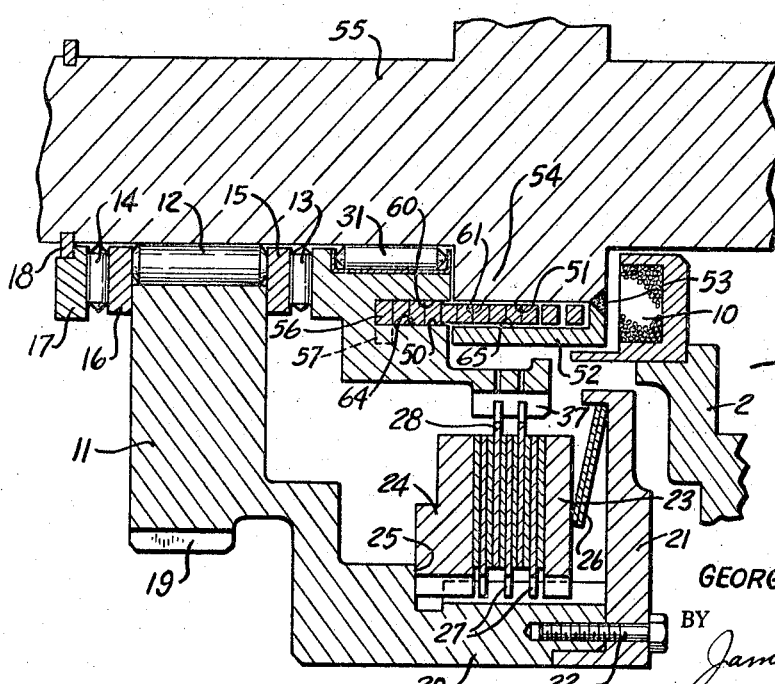
FIGURE 2 is a fragmentary, longitudinal, sectional view of another clutch made in accordance with the invention and illustrating a reversible clutch capable of transmitting oppositely directed torques.

The mechanism and arrangement shown in FIGURE 2 are generally similar to the FIGURE 1 device, and similar parts have been similarly numbered, except provision is made for the wrap spring to drive in either direction of rotation. For this purpose, both the hub and drive member each have an annular and axial recess 50, 51, respectively. The latter is formed by a sleeve 52 which is brazed at 53 to the radially enlarged portion 54 of the drive shaft 55. Portion 54 has been shown here as being formed integrally with the shaft 55.

The end 56 of the spring is anchored by its bent end 57 which fits into a corresponding hole in the hub in the known manner.

Normally, the spring is free of the cylindrical surfaces of the recesses in the hub and shaft except where it is anchored. When the coil is energized, however, the spring contracts to grip the surfaces 60, 61 of the hub and drive shaft, respectively, to thereby permit torque transmission in one direction of rotation. When the direction of rotation of shaft 55 is reversed and the coil 10 is actuated, the spring unwinds or expands, causing the other surfaces 64, 65 of the hub and shaft 55, respectively, to be gripped, and thus permits transmission of torque in the opposite direction.

With the mechanism shown in the above embodiments of the present invention, the wrap spring first transmits the torque load which is then thrown onto the plate clutch. The plate clutch may slip until the full load is being transmitted, and thus the friction plate clutch acts as a torque limiter preventing damage to the spring which would otherwise be caused due to high impact starting torques.

FIGURE 3

Figure 3:
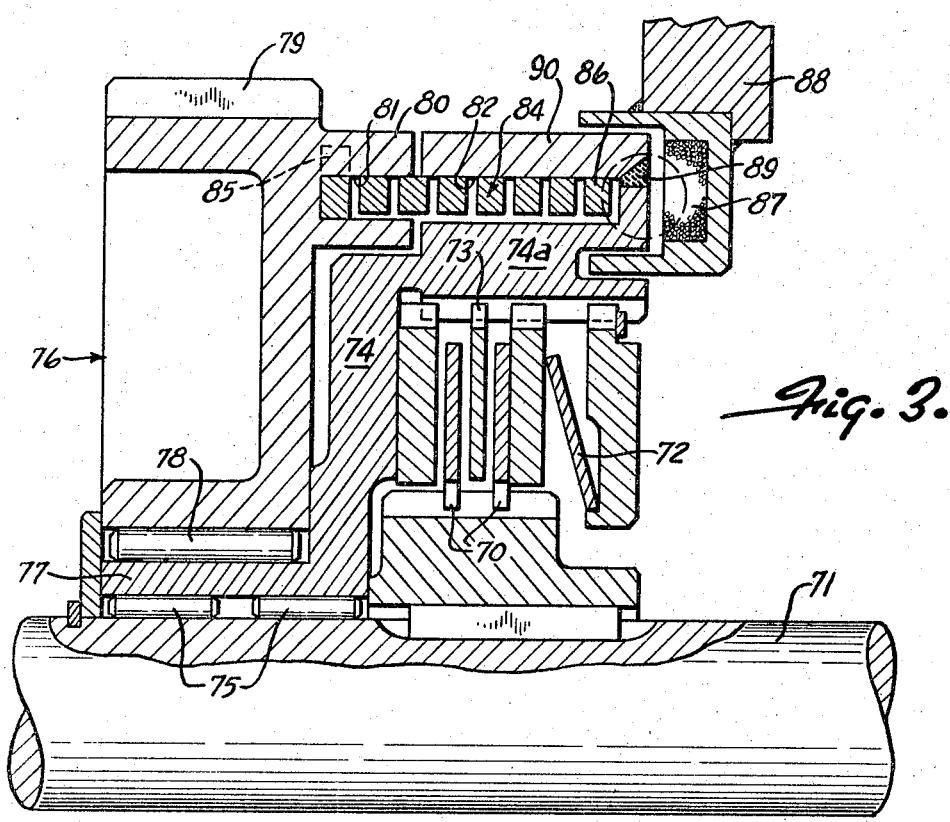
FIGURE 3 is another fragmentary, longitudinal, sectional view of another modification of the invention.

The modification shown in FIGURE 3 is particularly suitable where relatively low speed and high torque power transmission is encountered. In this form of the invention, the friction clutch is nested radially inward of the wrap spring. The arrangement is such that the friction plates 70 are splined directly to the drive shaft 71 and are resiliently held by Belleville spring 72 in contact with the interleaved plates 73 which in turn are splined to an overhanging, axially extending portion 74a of an intermediate clutch plate hub 74.

The hub 74 is mounted by antifriction bearing 75 on drive shaft 71, and an output member 76 is in turn mounted on the sleeve portion 77 of the hub by means of antifriction bearings 78. Alternatively, the output member could be freely, rotatably mounted directly on the drive shaft.

The output member includes an external gear 79 which can be connected to means (not shown) to be driven in any suitable manner. This output member also has an overhanging portion 80 having an annular recess 81 extending in an axial direction and in alignment with an opposed recess 82 in the hub 74.

A helical wrap spring 84 is located in recesses 81 and 82 and anchored by its bent tail 85 in the output member, and its free end 86 is adjacent an electro-magnetic coil 87 stationarily mounted on the housing 88. A bronze insert 89 is formed by the brazed connection between the outer portion 90 of the hub proper. This bronze portion insures a flux path, as indicated by the dotted line, which will cause the spring end to be pulled against the bottom of the recess 82 when the coil is energized.

The spring normally is free of the cylindrical surfaces of the recesses 81 and 82, except where it is anchored at 85, and when the coil 87 is energized, it will grip either the radially inner surfaces of recesses 81 and 82 or their radially outer surfaces depending on the direction of rotation of drive member 71, so as to correspondingly drive the output drive member 76.

Figure 4:
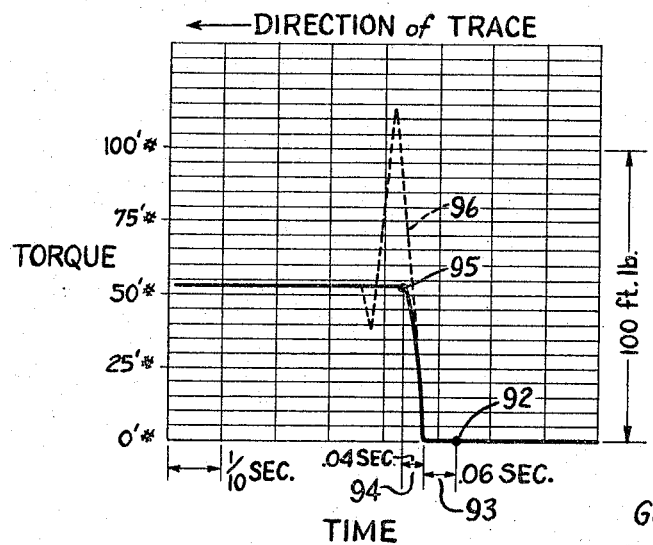
FIGURE 4 is a graph of torque plotted against time of an operation of a clutch made in accordance with the present invention.

With the mechanism shown in FIGURE 3, a compact mechanism has been provided wherein the friction clutch is engaged first but nevertheless acts as a safety device or maximum torque limiter to protect the wrap spring clutch. Both the clutches transmit the full torque load, and the combined action results in a smooth pick-up of the load with no peak shock loads. FIGURE 4 is a graph of torque plotted against time for an actual operation of a clutch made in accordance with the present invention. The point 92 indicates when the coil was energized, and the distance 93 indicates a period of time of about 0.06 second during which the last coil of the wrap spring shifts axially, that coil then wraps down, and the spring may slip very slightly. Then a period of time of about 0.04 second, as indicated at 94, is all that is required for the clutch actually to engage. The chart then further shows that when the maximum torque load is reached at 95, the torque remains constant with no peak shock loads. On the other hand, the dotted line 96 at that point indicates a typical torque shock peak load for a conventional clutch.

General

With the present arrangement, the coils of the springs need not be of any particular shape or size to provide certain resiliency or flexibility to insure its wrapping action. Instead, a spring of stiffer and stronger material can be utilized and failure thereof prevented.

The present mechanism has proved to be instantaneous in its action, very smooth in engagement, and with no peak shock loads.

Various modes of carrying out the invention are contemplated as being within the scope of the following claims particularly pointing out and distinctly claiming the subject matter which is regarded as the invention:

I claim:

1. A torque transmitting mechanism comprising, a rotatable drive member, a driven output member rotatably mounted around said drive member and coaxially arranged therewith, an intermediate clutch plate hub freely and rotatably supported on said drive member, a helical wrap spring having coils disposed around one of said members and said hub, said spring having one end which can torsionally deflect, stationary electro-magnetic coil means adjacent said one end of said spring for causing said one end of said spring to frictionally engage said one of said members and consequently deflect torsionally to establish a torque drive between said hub and said one member, friction plate-type clutch means between said hub and the other of said members, and means for constantly and resiliently biasing said clutch means into an engaged position.

2. Mechanism as defined in claim 1 further characterized in that said friction clutch means and said helical wrap spring are nested in radial alignment.

3. Mechanism as defined in claim 2 further characterized in that said hub has an overhanging, axially extending portion, and said friction clutch means includes friction plates mounted on said hub portion and extending radially therefrom.

4. Mechanism as defined in claim 1 further characterized in that said one of said members and said hub each have an annular and axially extending recess in which said spring is located, means for anchoring one end of said spring whereby energization of said coil causes deflection of the free end of said spring so that contraction thereof causes torque transmission in a rotational direction and expansion of said spring causes torque transmission in the other direction of rotation.

5. A torque transmitting mechanism comprising, a rotatable drive member, a driven output member rotatably mounted around said drive member and coaxially arranged therewith, an intermediate clutch plate hub freely and rotatably supported on said drive member, a helical spring having coils disposed around said drive member and said hub, said spring having one end for gripping engagement with said hub and the other end being torsionally deflectable into gripping contact with said drive member, stationary electro-magnetic coil means for causing said deflection of said spring end, friction clutch means between said hub and said output member, and means for constantly and resiliently biasing said clutch means into an engaged position.

6. A torque transmitting mechanism comprising, a rotatable drive member, a driven output member rotatably mounted around said drive member and concentrically arranged therewith, an intermediate clutch plate hub freely and rotatably supported on said drive member, a helical spring having coils disposed around said drive member and said hub, said spring having one end for gripping engagement with said hub and the other end being deflectable into gripping contact with said drive member so as to transmit torque from said drive member to said hub, stationary electro-magnetic coil means for causing said deflection of said spring end, friction clutch means between said hub and said output member, said friction clutch means being located in outward radial alignment with said helical spring so as to be concentric therewith, and spring means for constantly and resiliently biasing said clutch means into an engaged position.

7. Mechanism as defined as claim 6 further characterized in that said hub has an overhanging portion radially aligned with and outward of said spring, and clutch plates of said friction clutch means are mounted on said portion and extend radially therefrom.

8. Mechanism as defined in claim 5 further characterized in that said drive member and hub each have an annular and axially extending recess in which said spring is located, and means for anchoring one end of said spring in said hub whereby contraction of said spring coils effects torque transmission in one direction of rotation and expansion of said coils effects torque transmission in the other direction.

9. A torque transmitting mechanism comprising, a stationary housing, a rotatable drive shaft mounted in said housing on antifriction bearings, a driven output member rotatably supported on said drive member and arranged concentrically therewith, an intermediate clutch plate hub freely and rotatably supported on said drive member, a helical spring having coils disposed around said drive member and said hub, said spring having one end for gripping engagement with said hub and the other end being torsionally deflectable so as to deflect said coils into gripping contact with said drive member, stationary electro-magnetic coil means mounted on said housing for causing said deflection of said spring end, friction clutch means between said hub and said output member, and means for constantly and resiliently biasing said clutch means into an engaged position, said output member including an axially extending portion which is spaced radially outward of and encloses said helical spring and friction clutch means.

10. Mechanism as defined in claim 9 further characterized in that said clutch means is located in outward radial alignment with said spring and is concentric therewith.

11. Mechanism as defined in claim 10 further characterized in that said hub has an overhanging portion radially aligned with and outward of said spring, and clutch plates of said friction clutch means are mounted on said portion and extend radially therefrom.

12. A torque transmitting mechanism comprising, a rotatable drive member, a driven output member rotatably mounted around said drive member and coaxially arranged therewith and having an axially extending annular portion, a helical spring having coils disposed around said drive member, an intermediate clutch plate hub freely and rotatably suported on said drive member and having an overhanging portion radially aligned with and outward of said spring, said spring having one end for gripping engagement with said hub and the other end being deflectable so as to deflect said coils into gripping contact with said drive member for torque transmission from the drive member to the hub, stationary electro-magnetic coil means for causing said deflection of said spring end, said output member axially extending annular portion being spaced radially outward of and substantially enclosing said spring, friction clutch means between said hub overhanging portion and said annular portion of said output member and located in radial outward alignment with said spring and also enclosed by said annular portion of said output member, and means for constantly and resiliently biasing said clutch means into an engaged position.

13. A torque transmitting mechanism comprising, a rotatable drive member, a driven output member rotatably mounted around said drive member and coaxially arranged therewith, an intermediate clutch plate hub freely and rotatably supported on said drive member, a helical spring having coils disposed around said output member and said hub, said spring having one end for gripping engagement with said output member and the other end being torsionally deflectable into gripping contact with said hub, stationary electro-magnetic coil means adjacent said other end of said spring for causing said deflection of said spring end, friction plate-type clutch means between said hub and said drive member, and means for constantly and resiliently biasing said clutch means into an engaged position.

14. Mechanism as defined in claim 13 further characterized in that said friction clutch means is nested radially inwardly of and in radial alignment with said helical spring.

15. Mechanism as defined in claim 13 further characterized in that said hub has an overhanging portion radially aligned with and radially inward of said spring, and said friction clutch means includes friction clutch plates mounted on said overhanging portion and extending radially therefrom.

References Cited by the Examiner

UNITED STATES PATENTS

| | | | |
|---|---|---|---|
| 1,962,219 | 6/1934 | Starkey | 192—48 |
| 2,644,338 | 7/1953 | Miller | 192—48 X |
| 2,725,758 | 12/1955 | Dickey. | |
| 2,959,986 | 11/1960 | Irgens et al. | |
| 3,177,995 | 4/1965 | Mason. | |
| 3,177,996 | 5/1965 | Bates. | |

BENJAMIN W. WYCHE III, *Primary Examiner.*